United States Patent Office 3,437,820
Patented Apr. 8, 1969

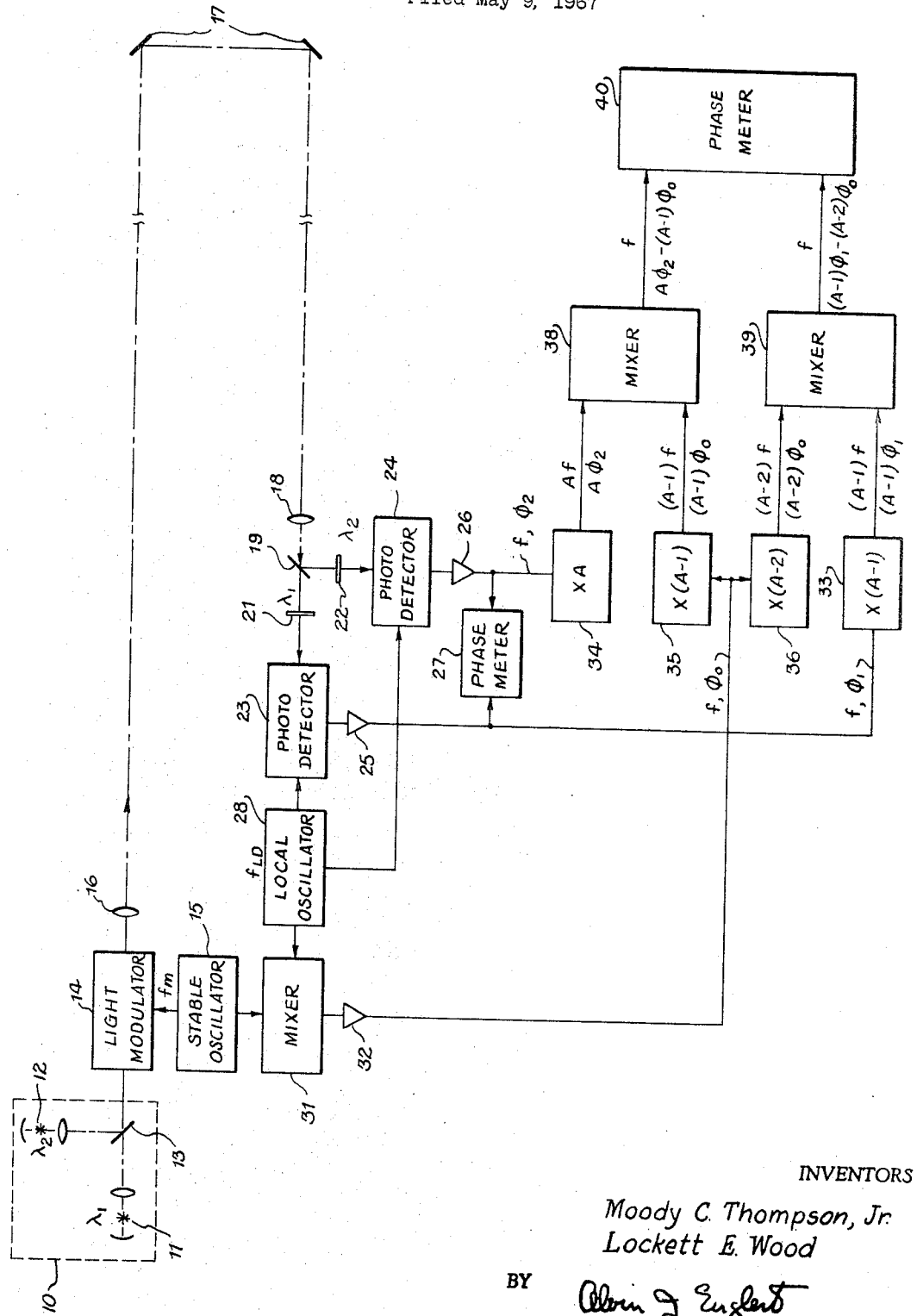

3,437,820
OPTICAL DISTANCE MEASURING EQUIPMENT UTILIZING TWO WAVELENGTHS OF LIGHT IN ORDER TO DETERMINE AND COMPENSATE FOR THE DENSITY OF THE AIR
Moody C. Thompson, Jr., and Lockett E. Wood, Boulder, Colo., assignors to the United States of America as represented by the Secretary of Commerce
Filed May 9, 1967, Ser. No. 638,195
Int. Cl. G01c 3/08
U.S. Cl. 250—217                                4 Claims

ABSTRACT OF THE DISCLOSURE

A light beam having two different wavelength components is modulated with an R-F signal and projected over an atmospheric path to be measured. The received beam is divided into its components and the modulation on each is detected. The phase difference between the detected signals, which is proportional to the average density of the atmospheric path, is measured. Also, the detected signals and the original signal are each frequency and phase multiplied and mixed so as to provide a phase difference which is proportional to the length of the path, corrected for the refractive index of the path.

Background of the invention

This invention relates to an optical distance measuring device which automatically corrects the measurements for the atmospheric index of refraction.

It is well known that the precise measurement of geodetic distances by optical means requires a determination of the average atmospheric index of refraction along the optical path at the time of the optical transmission. Heretofore, this has typically been accomplished by measuring the barometric pressure and the wet- and dry-bulb temperatures at selected points along the path at about the time of the optical transmission, converting these pressure and temperature data into refractive indexes, and averaging the results. Since the atmosphere generally is nonuniform and turbulent, the accuracy of the resultant value for the average refractive index is low, and the accuracy of the corrected geodetic distance in turn is also low.

Summary of the invention

The time-consuming measurements and calculations of the prior art are obviated by the present invention, which transmits light of two different wavelengths and utilizes the difference in their propagation velocities to determine and correct for the atmospheric index of refraction. The invention thus avoids the errors asociated with the small samplings, lack of real time measurements, and the barometric and thermometric imprecisions of the prior art. In addition, the present invention requires only a few additional electronic devices over those employed in the prior optical distance measuring devices.

Brief description of the drawing

The single figure is a block diagram of an exemplary, preferred embodiment of the invention.

Description of the preferred embodiment

The light source 10 shown in the figure emits light of two different wavelengths $\lambda_1$ and $\lambda_2$. The source 10 may consist of two monochromatic sources (e.g., lasers) 11 and 12 and a beam-splitter or dichroic mirror 13; or alternatively, it may consist of a source of spectral lines and suitable filters (not shown) for transmitting two selected lines. The light beam from source 10 is modulated at a frequency $f_m$ by a light modulator 14 and stable high frequency sinusoidal oscillator 15, and is then projected by a lens system 16 over the atmospheric path to be measured. A retro-reflector 17 at the end of the path returns the light beam to the sending station, where the light is collected by a lens 18 and divided into its two components by a dichroic mirror 19 and narrow-band optical filters 21, 22. The light component of wavelength $\lambda_1$ is incident on a suitable photodetector, such as a photomultiplier tube 23, while the component of wavelength $\lambda_2$ falls on photomultiplier tube 24.

In traversing the path from modulator 14 to retro-reflector 17 to photomultipliers 23, 24, the modulation on each of the light components experiences a phase shift given by $$\varphi_1 = \frac{\bar{n}_1 f_m 2L}{c} + \varphi_0 \quad (1)$$

$$\varphi_2 = \frac{\bar{n}_2 f_m 2L}{c} + \varphi_0 \quad (2)$$

where $\varphi_1$ and $\varphi_2$ are the phase shifts of the modulation on the light components of wavelengths $\lambda_1$ and $\lambda_2$, respectively, with respect to a reference signal of phase $\varphi_0$, $\bar{n}_1$ and $\bar{n}_2$ are the average values of the group refractive indexes for wavelengths $\lambda_1$ and $\lambda_2$ along the round trip path of length $2L$, $f_m$ is the frequency of oscillator 15, and $c$ is the velocity of light in vacuum. The phase shifts of $\varphi_1$ and $\varphi_2$ are different because the group refractive indexes $n_1$ and $n_2$ are different, i.e., the atmospheric path is dispersive.

Subtracting (1) and (2), the phase difference between the modulation on the light components $\lambda_1$ and $\lambda_2$ is obtained as $$\varphi_1 - \varphi_2 = \frac{2f_m L}{c}(\bar{n}_1 - \bar{n}_2) \quad (3)$$

The average values of the group refractive indexes along the path $2L$ can be expressed in terms of the average air density along the path:

$$\bar{n}_1 = 1 + (n_{g1} - 1)\bar{\rho} \quad (4)$$

$$\bar{n}_2 = 1 + (n_{g2} - 1)\bar{\rho} \quad (5)$$

where $n_{g1}$ and $n_{g2}$ are the group refractive indexes at wavelengths $\lambda_1$ and $\lambda_2$, respectively, for the atmosphere at standard conditions, and $\bar{\rho}$ is the average air density along the path. The constants $n_{g1}$ and $n_{g2}$ are available from accurate laboratory measurements and hence there is only a single unknown quantity $\bar{\rho}$, which can be related to the phase difference by combining (3), (4), and (5)

$$\varphi_1 - \varphi_2 = \frac{2f_m L}{c}(n_{g1} - n_{g2})\bar{\rho} \quad (6)$$

Solving (6) for $\bar{\rho}$ gives $$\bar{\rho} = \frac{c}{2f_m L(n_{g1} - n_{g2})}(\varphi_1 - \varphi_2) \quad (7)$$

The phase difference of the modulation on the two light components thus provides a measure of the average air density along the light path.

To measure the phase difference of the modulation, the outputs of the photomultipliers 23 and 24 are amplified by suitable amplifiers 25 and 26, respectively, and applied to a conventional phasemeter 27. In general, the modulation frequency $f_m$ is higher than the range accepted by ordinary phasemeters, and hence it is desirable to heterodyne the modulation signals with a local oscillator 28 of frequency $f_{lo} = f_m - f$, where $f$ is a frequency within the range accepted by the phasemeter 27. The heterodyning can be accomplished with conventional mixers, or preferably, by feeding the local oscillator output to a suitable electrode, such as the photocathode, of each of the photomultipliers 23, 24, whereby the photomultipliers serve as mixers as well as detectors for the modulation signals.

From the foregoing, the operation of the invention as an average air density meter will be evident. The light of wavelengths $\lambda_1$ and $\lambda_2$ from source 10 is modulated at frequency $f_m$ by modulator 14 and directed over the path whose average air density is to be measured. The light is returned over the path by retro-reflector 17, and divided into its $\lambda_1$ and $\lambda_2$ components, which are applied to photomultipliers 23 and 24, respectively. The photocathodes of the photomultipliers are driven by local oscillator 28, causing the photomultiplier outputs to vary at a lower frequency $f$. The phase difference between the resultant signals (which is equal to the phase difference between the modulation signals on the light components) is measured by phasemeter 27. The phasemeter reading is then multiplied by the coefficients indicated in expression (7) to obtain the average air density along the light path.

In accordance with a further aspect of this invention, the information contained in the modulation phase shifts is utilized to obtain the true or "dispersion-corrected" value of the length of the path light. To derive the expression for the true length of the path, expression (1) is rewritten as $$\varphi_1 - \varphi_0 = \frac{2f_m L}{c}\bar{n}_1 \quad (8)$$

Combining expressions (8) and (4)

$$\varphi_1 - \varphi_0 = \frac{2f_m L}{c}[1+(n_{g1}-1)\bar{\rho}] \quad (9)$$

The further combination of expressions (9) and (7) gives $$\varphi_1 - \varphi_0 = \frac{2f_m L}{c}\left[1+\frac{c}{2f_m L}\left(\frac{n_{g1}-1}{n_{g1}-n_{g2}}\right)(\varphi_1-\varphi_2)\right] = \frac{2f_m L}{c}+\left(\frac{n_{g1}-1}{n_{g1}-n_{g2}}\right)(\varphi_1-\varphi_2) \quad (10)$$

If we define $$A \equiv \frac{n_{g1}-1}{n_{g1}-n_{g2}} \quad (11)$$

then expression (10) becomes $$\varphi_1 - \varphi_0 = \frac{2f_m L}{c} + A(\varphi_1-\varphi_2) \quad (12)$$

Referring again to expression (1), it will be noted that if the refractive index $\bar{n}_1$ were unity, the phase $\varphi_T$ would give the true length 2L from the relation $$\varphi_T - \varphi_0 = \frac{f_m 2L}{c} \quad (13)$$

Substituting (13) in (12) gives $$\varphi_1 - \varphi_0 = \varphi_T - \varphi_0 + A(\varphi_1-\varphi_2)$$

which solved for $\varphi_T$ gives $$\varphi_T = \varphi_1 - A\varphi_1 + A\varphi_2 = A\varphi_2 - (A-1)\varphi_1 \quad (14)$$

Expression (13) can be rewritten as $$2L = c/f_m(\varphi_T - \varphi_0)$$

which combined with expression (14) gives $$2L = c/f_m[A\varphi_2-(A-1)\varphi_1-\varphi_0] \quad (15)$$

Expression (15) gives the true length of the round trip path 2L in terms of a combination of the phase sifts $\varphi_1$ and $\varphi_2$ suffered by the modulation on the $\lambda_1$ and $\lambda_2$ components projected over the path, and the reference phase angle $\varphi_0$ of the oscillator 15.

Referring again to the figure, there is shown a suitable circuit for obtaining the combination of phase shifts called for by expression (15). The stable oscillator 15 and the local oscillator 28 are each connected to a mixer 31 to obtain a signal of the same frequency $f$ as the outputs of the photomultipliers 23 and 24. An amplifier 32 similar to the amplifiers 25 and 26 is provided to amplify the output of the mixer 31. The amplifiers 25, 26 and 32 are connected to frequency/phase multipliers 33, 34 and 35, 36, respectively. Multipliers 34 and 35 are connected to a mixer 38, while multipliers 36 and 33 are connected to a mixer 39. The mixers 38 and 39 in turn are connected to a phasemeter 40.

The multiplication factor of multiplier 34 is A, where A is given by expression (11) above. The factors of multipliers 33 and 35 are each $(A-1)$, and the factor of multiplier 36 is $(A-2)$.

The signals from amplifiers 25, 26 and 32 are all of frequency $f(=f_m-f_{10})$ and have phase angles of $\varphi_1$, $\varphi_2$, and $\varphi_0$, respectively, as indicated at the inputs to the multipliers 33–36. The output of multiplier 33 accordingly has a frequency $(A-1)f$ and a phase angle $(A-1)\varphi_1$; the output of multiplier 34 has a frequency $Af$ and a phase angle $A\varphi_2$; and so forth, as shown in the figure. The mixers 38 and 39 mix these signals and produce difference-frequency output signals each of frequency $f$ and phase angles $[A\varphi_2-(A-1)\varphi_0]$ and $[(A-1)\varphi_1-(A-2)\varphi_0]$, respectively. The phasemeter 40 indicates the phase difference between the latter two signals:

$$\varphi_{40} = [A\varphi_2-(A-1)\varphi_0]-[(A-1)\varphi_1-(A-2)\varphi_0]$$
$$= A\varphi_2-A\varphi_0+\varphi_0-(A-1)\varphi_1+A\varphi_0-2\varphi_0$$
$$= A\varphi_2-(A-1)\varphi_1-\varphi_0 \quad (16)$$

Combining expressions (16) and (15) gives $$2L = \frac{c}{f_m}\varphi_{40} \quad (17)$$

The true, dispersion-corrected distance L of the light path thus is proportional to the phase difference $\varphi_{40}$ indicated by the phasemeter 40. The constant of proportionality is given by the precisely-known physical constant $c$ (the velocity of light in vacuum) and the frequency $f_m$ of the oscillator 15, which can readily be determined to very high accuracy, for example, 1 part in $10^9$.

In the operation of the distance measuring system of the present invention, the light at wavelengths $\lambda_1$ and $\lambda_2$ from source 10 is modulated at frequency $f_m$ and directed over the path to be measured. The received light is divided into the components $\lambda_1$ and $\lambda_2$, and the modulation on each is detected and heterodyned to a lower frequency $f$. The modulating signal $f_m$ is also heterodyned to the lower frequency $f$. The resultant three signals contain information concerning the true length of the light path in their phase angles, and the signals accordingly are frequency/phase multiplied at 33–36 and subsequently mixed at 38, 39 to provide two signals having a phase difference proportional to the true length. The phase difference is measured by the phasemeter 40, which, for a fixed modulating frequency $f_m$, can be directly calibrated in units of length if desired. Since the phase difference indicated by meter 40 will vary from zero to $2\pi$ radians in each multiple of the length corresponding to $2\pi$ radians, the length of the path must be known to within the length that corresponds to $2\pi$ radians. In many cases, the path length will be known to this accuracy, or the phase difference $\varphi_{40}$ can be measured for several different modulation frequencies $f_m$, enabling the operator to calculate the path length by the techniques that are old in the optical distance measuring field.

While the invention has been described with reference to a specific illustrative embodiment, the invention is not limited to the details shown, but includes all such modifications and variations as fall within the scope and meaning of the claims.

We claim:
1. An optical measuring device comprising,
   means for generating light at two different wavelengths,
   means for modulating said light at a radio frequency,
   means for projecting said modulated light over an atmospheric path,
   means for receiving said light and dividing it into said two component wavelengths,
   means for detecting the modulation on each of said components, and
   means for measuring the phase difference between the modulations on said components, to obtain a measure of the average air density along said atmospheric path.
2. A device as set forth in claim 1, and further comprising,
   means for heterodyning each of said detected modulations, prior to said phase measuring means.
3. A device as set forth in claim 2, wherein said heterodyning means comprises,
   two photomuliplier tubes, each arranged to receive a respective one of said two wavelengths components, and
   a local oscillator connected to an electrode of each of said photomultiplier tubes, so as to mix said modulation and local oscillator signals.
4. A device as set forth in claim 1 and further comprising,
   first means for multiplying the frequency and phase of the modulation detected from one of said wavelength components $(A-1)$ times, where

$$A = \frac{n_{g1} - 1}{n_{g1} - n_{g2}}$$

and $n_{g1}$ and $n_{g2}$ are the group refractive indexes at said one and said other wavelengths, respectively, for the atmosphere at standard conditions,
   second means for multiplying the frequency and phase of the modulation detected from said outer wavelength component $A$ times,
   third and fourth means for multiplying the frequency and phase of the modulating signal from said modulating means $(A-1)$ times, and $(A-2)$ times, respectively,
   first means for mixing the outputs of said first and fourth multiplying means,
   second means for mixing the outputs of said second and third multiplying means, and
   means for measuring the phase difference between the outputs of said first and second mixing means to obtain a measure of the true length of said atmospheric path.

References Cited

UNITED STATES PATENTS 2,966,090  12/1960  Scholdstrom _____ 250—216 X

RALPH G. NILSON, *Primary Examiner.*

T. N. GRIGSBY, *Assistant Examiner.*

U.S. Cl. X.R.

250—216, 218, 214, 226; 356—5